US012764088B2

(12) United States Patent
Sharma et al.

(10) Patent No.: US 12,764,088 B2
(45) Date of Patent: Oct. 13, 2026

(54) EFFICIENTLY MAPPING A DISTRIBUTED RESOURCE TO A VIRTUAL NETWORK

(71) Applicant: Microsoft Technology Licensing, LLC, Redmond, WA (US)

(72) Inventors: Parag Sharma, Issaquah, WA (US); Hemant Kumar, Bellevue, WA (US); Xinyan Zan, Sammamish, WA (US); Nimish Aggarwal, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 217 days.

(21) Appl. No.: 18/417,838

(22) Filed: Jan. 19, 2024

(65) Prior Publication Data

US 2024/0187369 A1 Jun. 6, 2024

Related U.S. Application Data

(60) Continuation of application No. 17/492,859, filed on Oct. 4, 2021, now Pat. No. 11,882,090, which is a (Continued)

(51) Int. Cl.
*H04L 61/10* (2022.01)
*G06F 9/455* (2018.01)
(Continued)

(52) U.S. Cl.
CPC .......... *H04L 61/10* (2013.01); *G06F 9/45545* (2013.01); *H04L 12/4641* (2013.01);
(Continued)

(58) Field of Classification Search
CPC ... G06F 2009/4557; G06F 2009/45595; G06F 9/45545; H04L 12/4641; H04L 61/10; H04L 61/5007
(Continued)

(56) References Cited

U.S. PATENT DOCUMENTS

| | | | | | |
|---|---|---|---|---|---|
| 6,104,717 | A * | 8/2000 | Coile | H01R 31/005 | 370/352 |
| 7,454,500 | B1 * | 11/2008 | Hsu | H04L 67/1001 | 709/226 |

(Continued)

OTHER PUBLICATIONS

Communication pursuant to Article 94(3) received in European Application No. 20736883.8, mailed on May 7, 2024, 4 pages.

(Continued)

*Primary Examiner* — David P Zarka
(74) *Attorney, Agent, or Firm* — Ray Quinney & Nebeker P.C.; James Bullough

(57) ABSTRACT

A distributed resource may be mapped into a virtual network, where the resource is distributed across a large number of nodes that are uniquely addressable within the distributed resource service's address space. The resource can be represented using a relatively small number of private VIP addresses within the virtual network, while still enabling access to all of the nodes that are uniquely addressable within the address space of the distributed resource service. A resource map may be created that relates the distributed resource service's address space to the virtual network's address space. The resource map may be used by a gateway that facilitates access to a distributed resource by clients. The resource map may also be used to translate packets that are sent from clients within a virtual network into the distributed resource service's address space.

20 Claims, 10 Drawing Sheets

Related U.S. Application Data division of application No. 16/572,491, filed on Sep. 16, 2019, now Pat. No. 11,140,121.

(51) Int. Cl.
*H04L 12/46* (2006.01)
*H04L 61/5007* (2022.01)

(52) U.S. Cl.
CPC .. *H04L 61/5007* (2022.05); *G06F 2009/4557* (2013.01); *G06F 2009/45595* (2013.01)

(58) Field of Classification Search
USPC .......................................................... 709/226
See application file for complete search history.

(56) References Cited

U.S. PATENT DOCUMENTS

| | | | | |
|---|---|---|---|---|
| 8,174,984 | B2 * | 5/2012 | Tripathi | G06F 13/385<br>370/235 |
| 9,055,117 | B1 * | 6/2015 | Dickinson | G06F 9/45558 |
| 9,071,928 | B2 * | 6/2015 | Ward | H04W 4/02 |
| 9,935,920 | B2 * | 4/2018 | Sridharan | G06F 9/45558 |
| 11,140,121 | B2 * | 10/2021 | Sharma | G06F 9/5077 |
| 11,882,090 | B2 * | 1/2024 | Sharma | H04L 12/4641 |
| 12,634,256 | B2 * | 5/2026 | Oxman | H04L 61/256 |
| 2002/0186698 | A1 * | 12/2002 | Ceniza | H04L 12/4641<br>370/351 |
| 2018/0069920 | A1 * | 3/2018 | Huang | H04L 67/1001 |
| 2020/0236048 | A1 * | 7/2020 | Branch | H04L 12/4633 |
| 2021/0084003 | A1 * | 3/2021 | Sharma | H04L 61/5007 |

OTHER PUBLICATIONS

Communication under Rule 71(3) EPC received in European Application No. 20736883.8, mailed on May 20, 2026, 08 pages.

* cited by examiner

EFFICIENTLY MAPPING A DISTRIBUTED RESOURCE TO A VIRTUAL NETWORK

CROSS-REFERENCE TO RELATED APPLICATIONS

This application is a Continuation of U.S. patent application Ser. No. 17/492,859, filed on Oct. 4, 2021 which is a Divisional of U.S. patent application Ser. No. 16/572,491, filed on Sep. 16, 2019, the entireties of which are incorporated herein by reference.

BACKGROUND

Cloud computing is the delivery of computing services (e.g., servers, storage, databases, networking, software, analytics) over the Internet. Broadly speaking, a cloud computing system includes two sections, a front end and a back end, that are in electronic communication with one another via the Internet. The front end includes the interface that users encounter through a client device. The back end includes the resources that deliver cloud-computing services, including processors, memory, storage, and networking hardware. The back end of a cloud computing system typically includes one or more data centers, which may be located in different geographical areas. Each data center typically includes a large number (e.g., hundreds or thousands) of computing devices, which may be referred to as host machines or servers.

Cloud computing systems can provide many different types of services. As an example, cloud computing systems can provide network virtualization services. Network virtualization involves combining hardware and software network resources and network functionality into a software-based administrative entity, which may be referred to as a "virtual network." A cloud computing service provider may enable users (e.g., customers) to create virtual networks within a cloud computing system. The use of network virtualization technologies in the context of a cloud computing environment is sometimes referred to as software-defined networking.

A cloud computing system may also include services that enable users to create and manage various types of resources. In this context, the term "resource" may refer to any manageable item that is available via a cloud computing system. Some examples of resources include databases, virtual machines, virtual data stores, and web applications.

Computing devices use Internet protocol (IP) addresses and port numbers to send and receive data from other devices. An IP address is a numerical label assigned to an entity (e.g., a network interface of a computing device) that uses the Internet Protocol to communicate over a computer network. A port number is a logical construct that identifies a communication endpoint within an entity.

There are two different categories of IP addresses: public and private. A public IP address is a globally unique IP address that can be accessed over the Internet. A private IP address, on the other hand, is not globally unique, and IP packets that contain private IP addresses cannot be routed through the public Internet. Private IP addresses are not allocated to any specific organization and anyone may use these addresses without approval from a regional Internet registry. Private IP addresses are commonly used for local area networks (LANs) in residential, office, and enterprise environments. The set of IP addresses and port numbers that are (or may be) assigned to networked devices or entities within a particular network may be referred to as the "address space" of that network.

A virtual IP (VIP) address is an IP address that does not correspond to an actual physical network interface. Resources that are managed by a cloud computing system, including resources within a virtual network, may be associated with VIP addresses. VIP addresses may be public or private. The term "private VIP address" may refer to a VIP address that has the characteristics of a private IP address, as described above. Similarly, the term "public VIP address" may refer to a VIP address that has the characteristics of a public IP address, as described above.

A resource may be distributed across multiple nodes. Some resources may be massively distributed across a large number of nodes. Each of these nodes may be uniquely addressable within an address space that is used by the distributed resource service. For example, each node may be associated with a unique combination of a public VIP address and a port number.

For various reasons, it may be desirable to map a distributed resource into a virtual network, so that the various nodes of the resource can be accessed using the virtual network's address space. It can, however, be challenging to map a resource that is highly distributed across a very large number of nodes into a virtual network. With known techniques, mapping a highly distributed resource into a virtual network can consume a significant number of private IP addresses within the virtual network's address space. This is an inefficient use of the virtual network's address space, and it can be frustrating to the virtual network's owner. Benefits may therefore be realized by improved techniques for mapping a highly distributed resource into a virtual network.

SUMMARY

In accordance with one aspect of the present disclosure, a computer-implemented method is disclosed that includes receiving a request to map a distributed resource to a first virtual network. The distributed resource is distributed across a plurality of nodes that are uniquely addressable in a distributed resource service address space. The method further includes mapping the distributed resource to the first virtual network such that a number of private virtual Internet protocol (VIP) addresses used by the distributed resource in a first virtual network address space is less than the plurality of nodes. The method further includes distributing a resource map to entities within the first virtual network. The resource map relates the first virtual network address space to the distributed resource service address space.

Mapping the distributed resource to the first virtual network may include assigning the distributed resource a first private VIP address from within the first virtual network address space and assigning each node of the plurality of nodes a port number that uniquely identifies the node within the first virtual network address space.

The method may further include mapping the distributed resource to a second virtual network. Mapping the distributed resource to the second virtual network may include assigning the distributed resource a second private VIP address from within a second virtual network address space and assigning each node of the plurality of nodes a same port number that was assigned to the node within the first virtual network address space.

The resource map may include, for each node of the plurality of nodes, first address information that uniquely identifies the node within the first virtual network address space and second address information that uniquely identifies the node within the distributed resource service address space.

The resource map may include, for each node of the plurality of nodes, information indicating a relationship between a port number that uniquely identifies the node within the first virtual network address space and a combination of a public VIP address and an endpoint identifier that uniquely identifies the node within the distributed resource service address space.

Distributing the resource map to the entities within the first virtual network may include causing the resource map to be delivered to a plurality of networking stacks within host machines corresponding to the first virtual network.

The method may further include causing the resource map to be delivered to a gateway within a distributed resource service that manages the distributed resource.

The method may further include adding new information to the resource map that maps a previously unused port number to a combination of a public VIP address and an endpoint identifier and pushing an updated resource map to networking stacks within host machines corresponding to the first virtual network.

The method may further include receiving a request from a distributed resource service to remove an entry from the resource map and providing an updated resource map to networking stacks within host machines corresponding to the first virtual network. The updated resource map may not include the entry. The method may further include determining that the updated resource map has been made available to all of the networking stacks within all of the host machines corresponding to the first virtual network and notifying the distributed resource service that the entry has been successfully removed from the resource map.

In accordance with another aspect of the present disclosure, a computer-implemented method is disclosed that includes receiving a redirect request message at a gateway for a distributed resource service. The redirect request message indicates a request to access a distributed resource that is distributed across a plurality of nodes. The distributed resource service manages the distributed resource. The method further includes detecting that the redirect request message is from a client that belongs to a virtual network that has mapped the distributed resource to a private virtual Internet protocol (VIP) address and sending address information to the client in response to the redirect request message. The address information indicates how to access the distributed resource. The address information is in a virtual network address space.

The address information may include a plurality of address-port pairs. Each address-port pair may include the private VIP address and a different port number that uniquely identifies a different node in the virtual network address space.

The address information may include a plurality of name-port pairs. Each name-port pair may include a domain name server (DNS) name that resolves to the private VIP address and a different port number that uniquely identifies a different node in the virtual network address space.

The method may further include accessing a resource map to determine the address information. The resource map may include, for each node of the plurality of nodes, first information that uniquely identifies the node within the virtual network address space and second information that uniquely identifies the node within a distributed resource service address space.

The method may further include accessing a resource map to determine the address information. The resource map may include, for each node of the plurality of nodes, a port number that uniquely identifies the node within the virtual network address space. The map may further include a combination of a public VIP address and an endpoint identifier that uniquely identifies the node within a distributed resource service address space.

In accordance with another aspect of the present disclosure, a computer-implemented method is disclosed that includes detecting that a packet includes address information identifying a distributed resource and a node and determining that the address information corresponds to a virtual network address space. The distributed resource is distributed across a plurality of nodes that are uniquely addressable in a distributed resource service address space. The method may further include accessing a resource map that relates the virtual network address space to the distributed resource service address space and translating the packet from the virtual network address space to the distributed resource service address space based on the resource map, thereby creating a translated packet. The method may further include causing the translated packet to be sent to the node.

The distributed resource may be mapped to the virtual network address space such that a number of private virtual Internet protocol (VIP) addresses used by the distributed resource in the virtual network address space is less than the plurality of nodes.

The resource map may include, for each node of the plurality of nodes, first information that uniquely identifies the node within the virtual network address space and second information that uniquely identifies the node within the distributed resource service address space.

The packet may include a private virtual IP (VIP) address as a destination address. The private VIP address may identify the distributed resource within the virtual network address space. The packet may also include a port number as a destination port. The port number may identify the node within the virtual network address space.

The translated packet includes a public virtual IP (VIP) address as a destination address and an endpoint identifier as a destination port. A combination of the public VIP address and the endpoint identifier may identify the node within the distributed resource service address space.

The resource map may include information indicating a relationship between a port number that uniquely identifies the node within the virtual network address space and a combination of a public VIP address and an endpoint identifier that uniquely identifies the node within the distributed resource service address space.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages will be set forth in the description that follows. Features and advantages of the disclosure may be realized and obtained by means of the systems and methods that are particularly pointed out in the appended claims. Features of the present disclosure will become more fully apparent from the following description and appended claims, or may be learned by the practice of the disclosed subject matter as set forth hereinafter.

BRIEF DESCRIPTION OF THE DRAWINGS

In order to describe the manner in which the above-recited and other features of the disclosure can be obtained, a more particular description will be rendered by reference to specific embodiments thereof which are illustrated in the appended drawings. For better understanding, the like elements have been designated by like reference numbers throughout the various accompanying figures. Understanding that the drawings depict some example embodiments, the embodiments will be described and explained with additional specificity and detail through the use of the accompanying drawings in which.

DETAILED DESCRIPTION

The present disclosure is generally related to mapping a resource that is maintained by a distributed resource service into a virtual network, where the resource is distributed across a large number of nodes that are uniquely addressable within the distributed resource service's address space. The techniques disclosed herein enable the resource to be represented using a relatively small number of private VIP addresses (perhaps even just a single private VIP address) within the virtual network, while still enabling access to all of the nodes that are uniquely addressable within the address space of the distributed resource service.

One way to map a highly distributed resource into a virtual network would be to assign a different private VIP address to each of the nodes that are uniquely addressable within the distributed resource service's address space. However, for a resource that is distributed across a large number of uniquely addressable nodes (e.g., thousands or tens of thousands of uniquely addressable nodes), this approach would consume a significant number of private VIP addresses, which would be an inefficient use of the virtual network's address space.

The techniques disclosed herein enable a highly distributed resource to be mapped into a virtual network without consuming very many private VIP addresses within the virtual network's address space. In accordance with the present disclosure, the resource may be assigned a relatively small number of private VIP addresses (in some cases, just one private VIP address) within the virtual network's address space. In addition, the uniquely addressable nodes across which the resource is distributed may each be assigned a port number that is unique within the virtual network's address space.

A map may be created that relates the distributed resource service's address space to the virtual network's address space. Such a map may be referred to herein as a resource map. The resource map may include, for each node, information about how the node is identified in the address space of the virtual network as well as information about how the node is identified in the address space of the distributed resource service. In some embodiments, a resource map may include, for each node, information that relates (i) the port number that uniquely identifies that node within the virtual network's address space, and (ii) the combination of a public VIP address and an endpoint identifier that uniquely identifies the node within the distributed resource service's address space.

Figure 1:
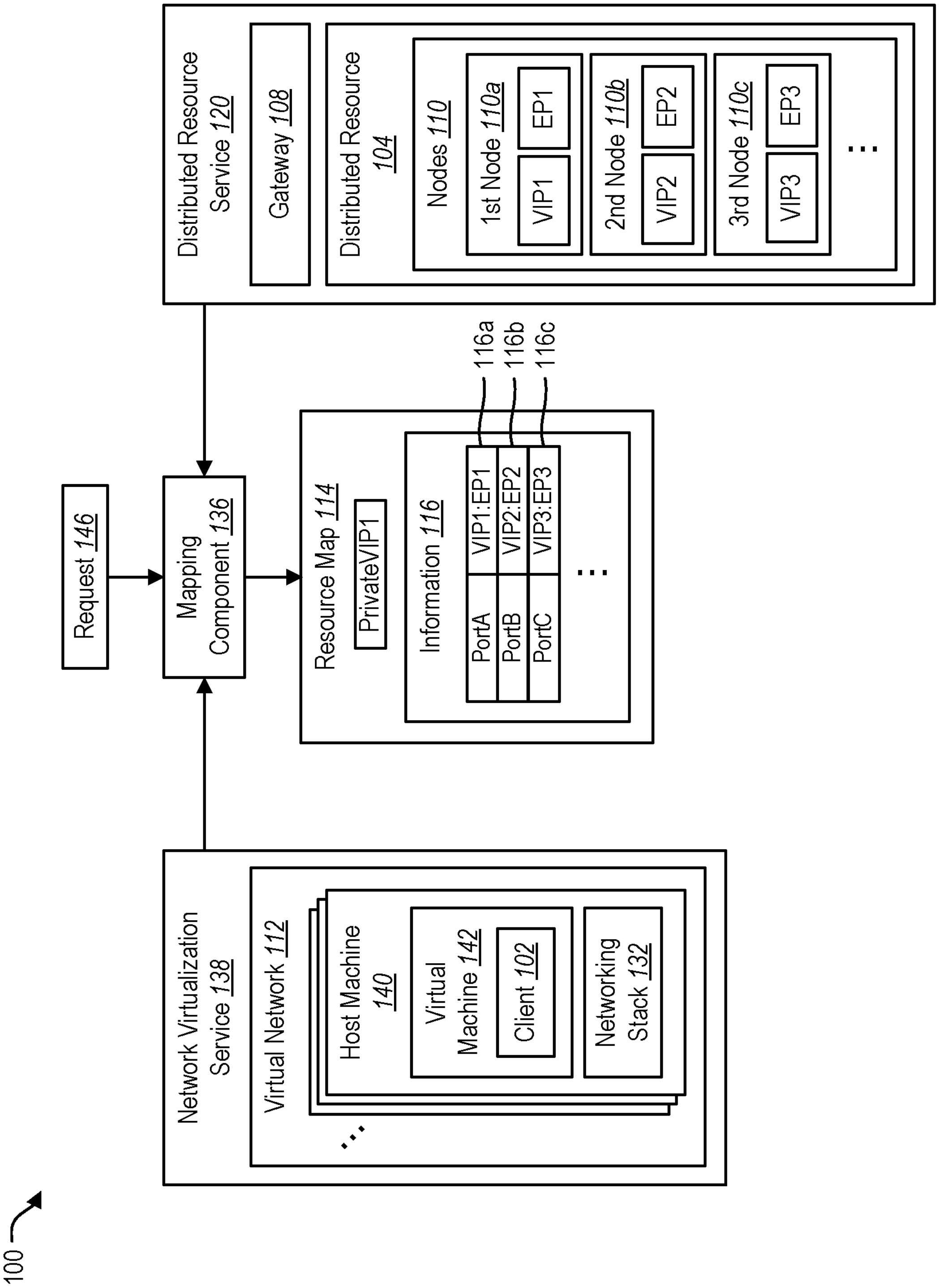
FIG. 1 illustrates an example of a system in which a distributed resource can be mapped into a virtual network.

FIG. 1 illustrates an example of a system 100 in which a distributed resource 104 can be mapped into a virtual network 112. The distributed resource 104 may be managed by a service 120 that is provided by a cloud computing system. The service 120 may be referred to herein as a distributed resource service 120. As an example, the distributed resource 104 could be a database, and the distributed resource service 120 could be a database service of a cloud computing system.

In the depicted system 100, the resource 104 is distributed across a plurality of nodes 110 that are uniquely addressable within the address space of the distributed resource service 120. The nodes 110 are each associated with a globally unique combination of a public VIP address and an endpoint identifier. For purposes of example, a first node 110*a* is shown with a public VIP address of VIP1 and an endpoint identifier of EP1. A second node 110*b* is shown with a public VIP address of VIP2 and an endpoint identifier of EP2. A third node 110*c* is shown with a public VIP address of VIP3 and an endpoint identifier of EP3.

In this context, the term "endpoint identifier" may refer to any numerical or alphanumerical representation that can be used to identify a communication endpoint within an entity. In some cases, an endpoint identifier may be a port number. However, for the sake of clarity in distinguishing between the address space of the virtual network 112 and the address space of the distributed resource service 120, the term "port number" may be used in connection with the former and the term "endpoint identifier" may be used in connection with the latter.

For the sake of simplicity, only three nodes 110*a-c* are shown in FIG. 1. However, the resource 104 may be distributed across a very large number of nodes 110 (e.g., hundreds or thousands of nodes 110).

It may be desirable to map the distributed resource 104 into a virtual network 112. One way to map the distributed resource 104 into the virtual network 112 would be to assign a different private VIP address to each of the nodes 110 that are uniquely addressable within the address space of the distributed resource service 120. However, if the resource 104 is distributed across a large number of uniquely addressable nodes 110 (e.g., thousands or tens of thousands of uniquely addressable nodes 110), this approach would consume a significant number of private VIP addresses, which would be an inefficient use of the address space of the virtual network 112.

The techniques disclosed herein enable the distributed resource 104 to be mapped into the virtual network 112 without consuming very many private VIP addresses within the address space of the virtual network 112. In the depicted example, the distributed resource 104 is assigned a single private VIP address within the address space of the virtual network 112. This private VIP address will be referred to as Private VIP1. In addition, each of the uniquely addressable nodes 110 across which the resource 104 is distributed is assigned a port number that is unique within the virtual network 112. In the depicted example, the port number that is assigned to the first node 110*a* will be referred to as PortA, the port number that is assigned to the second node 110*b* will be referred to as PortB, and the port number that is assigned to the third node 110*c* will be referred to as PortC.

The resource map 114 relates the address space of the distributed resource service 120 to the address space of the virtual network 112. In other words, the resource map 114 includes, for each node 110, address information indicating how the node 110 is identified in the address space of the virtual network 112 as well as address information indicating how the node 110 is identified in the address space of the distributed resource service 120.

In the depicted example, the resource map 114 includes the private VIP address (PrivateVIP1) that is assigned to the distributed resource 104. In addition, the resource map 114 includes, for each node 110, information 116 about the relationship between (i) the port number that uniquely identifies that node 110 within the address space of the virtual network 112, and (ii) the combination of a public VIP address and an endpoint identifier that uniquely identifies that node 110 within the address space of the distributed resource service 120. Thus, in the depicted example, the resource map 114 includes information 116*a* about the relationship between (i) the port number (PortA) that uniquely identifies the first node 110*a* in the address space of the virtual network 112, and (ii) the combination of a public VIP address (VIP1) and an endpoint identifier (EP1) that uniquely identifies the first node 110*a* in the address space of the distributed resource service 120. The resource map 114 also includes information 116*b* about the relationship between (i) the port number (PortB) that uniquely identifies the second node 110*b* in the address space of the virtual network 112, and (ii) the combination of a public VIP address (VIP2) and an endpoint identifier (EP2) that uniquely identifies the second node 110*b* in the address space of the distributed resource service 120. The resource map 114 also includes information 116*c* about the relationship between (i) the port number (PortC) that uniquely identifies the third node 110*c* in the address space of the virtual network 112, and (ii) the combination of a public VIP address (VIP3) and an endpoint identifier (EP3) that uniquely identifies the third node 110*c* in the address space of the distributed resource service 120.

In the depicted embodiment, only one private VIP address (Private VIP1) is used by the distributed resource 104 in the address space of the virtual network 112. In an alternative embodiment, a distributed resource may use more than one private VIP address. Even in embodiments where a distributed resource uses more than one private VIP address, the techniques disclosed herein enable the number of private VIP addresses that are used by a distributed resource 104 in the address space of a virtual network 112 to be significantly less than the number of nodes 110 that are uniquely addressable in the address space of the distributed resource service 120. In some embodiments, the number of private VIP addresses that are used by a distributed resource 104 in the address space of a virtual network 112 may be at least one hundred times less than the number of nodes 110 that are uniquely addressable in the address space of the distributed resource service 120. In other embodiments, the number of private VIP addresses that are used by a distributed resource 104 in the address space of a virtual network 112 may be at least one thousand times less than the number of nodes 110 that are uniquely addressable in the address space of the distributed resource service 120.

The resource map 114 may be created based at least in part on information about the distributed resource 104 provided by the distributed resource service 120. In some embodiments, the resource map 114 may be created by the distributed resource service 120 that manages the distributed resource 104. In other embodiments, the resource map 114 may be created by a network virtualization service 138 that manages the virtual network 112. In still other embodiments, the resource map 114 may be created by one or more entities that are distinct from both the distributed resource service 120 and the network virtualization service 138. The entity (or combination of entities) that creates the resource map 114 is represented in FIG. 1 as a mapping component 136. The mapping component 136 may create the resource map 114 in response to a request 146 from an authorized entity, such as an owner or representative of the virtual network 112.

The resource map 114 may be distributed to and used by various entities that implement the virtual network 112 as well as various entities that implement the distributed resource service 120. For example, the resource map 114 may be distributed to host machines 140 that host virtual machines 142 that belong to the virtual network 112. The resource map 114 may be used by the networking stacks 132 on the host machines 140 to translate packets that are sent by clients 102 within the virtual network 112 from the address space of the virtual network 112 to the address space of the distributed resource service 120. This will be discussed in greater detail below. The resource map 114 may also be distributed to and used by various entities that implement the distributed resource service 120, such as a gateway 108 that facilitates access to the distributed resource 104 by clients 102 within the virtual network 112. This, too, will be discussed in greater detail below.

From time to time, changes may be made to the way in which the resource 104 is distributed across the nodes 110. As an example, the resource 104, or parts of the resource 104, may be stored on additional nodes 110. As another example, the resource 104, or parts of the resource 104, may be removed from existing nodes 110 for various reasons (e.g., failover, decommissioning of old nodes 110). As such changes are made, the resource map 114 may be updated based on the modifications that are made. Another aspect of the present disclosure is a safe update mechanism to change the resource map 114 when the nodes 110 for the distributed resource 104 change. It can be important for the gateway 108 and the networking stacks 132 on the host machines 140 to use the same resource map 114, because otherwise traffic can be misdirected. The updated resource map 114 may be distributed to and used by various entities that implement the virtual network 112 as well as various entities that implement the distributed resource service 120.

In some situations, the distributed resource service 120 may add to the resource map 114. For example, the distributed resource service 120 may provide entries mapping previously unused private ports to <public VIP, endpoint identifier> pairs. An updated resource map 114 may be proactively pushed to the networking stacks 132 on the host machines 140. In addition, a "lazy" (or "on-demand") pull of the resource map 114 may also be utilized in case the networking stack 132 detects traffic to a private port that is not present in the current resource map 114.

When additions are made to the resource map 114, this generally means that the resource 104 has been distributed across additional nodes 110. In other words, more nodes 110 have been added that store aspects of the distributed resource 104. It can be desirable for the system 100 to begin using the additional nodes 110 quickly. In some embodiments, when previously unused private ports corresponding to newly added nodes 110 are mapped to <public VIP, endpoint identifier> pairs and those mappings are added to the resource map 114, the entities within the system 100 may be authorized to begin using the new private ports immediately, without necessarily confirming that all of the host machines 140 across the entire system 100 have received the updated resource map 114. When a gateway 108 (or a host machine 140) receives a request that includes a reference to a port that is not included in the resource map 114, the gateway 108 (or host machine 140) can pull the resource map 114 at that time. This is the "lazy" (or "on-demand") pull referred to earlier.

In some situations, the distributed resource service 120 may remove entries from the resource map 114. For example, the distributed resource service 120 may request removal of private port entries from the resource map 114 after ensuring that no parts of the distributed resource 104 are on the nodes 110 being removed. When entries are being removed from the resource map 114, the "lazy" (or "on-demand") pull described above should not be used, because this can cause packets to be routed incorrectly. Therefore, where entries have been removed from the resource map 114, a safe but slow rollout of the resource map 114 may be utilized to ensure that the version of the resource map 114 with the desired entries removed is made available to each instance of the networking stack 132 in the entire cloud computing system 100. After this confirmation has been received, the distributed resource service 120 may be notified that the request to remove the private port entries is successful. At this point the distributed resource service 120 may reuse the private ports by requesting addition of the private ports in the manner discussed above.

Figure 2:
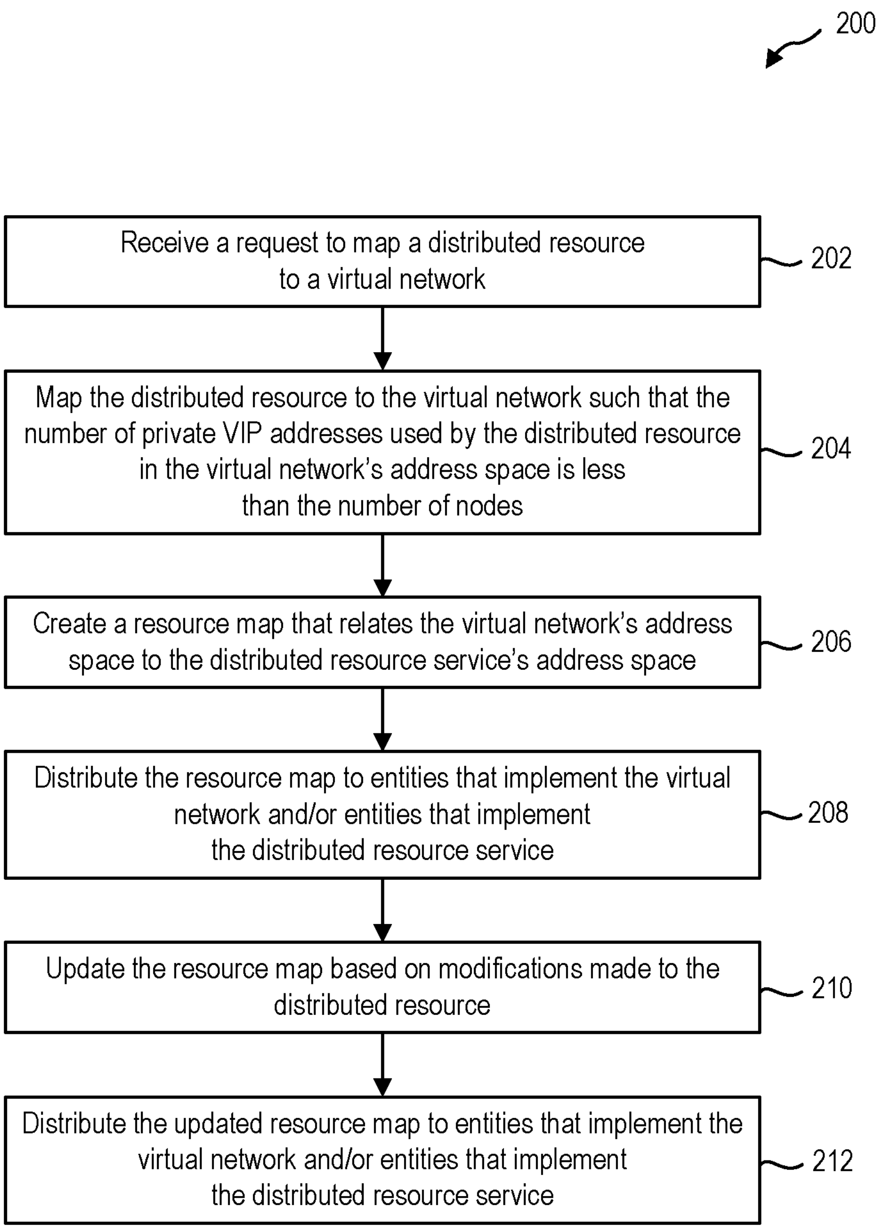
FIG. 2 illustrates an example of a method that may be performed by an entity (or a combination of entities) that is represented in the system of FIG. 1 as a mapping component.

FIG. 2 illustrates an example of a method 200 that may be performed by an entity (or a combination of entities) that is represented in FIG. 1 as a mapping component 136. The method 200 will be described in relation to the system 100 shown in FIG. 1.

At some point, a request 146 to map a distributed resource 104 to a virtual network 112 may be received 202. In response to such a request 146, a mapping component 136 may map 204 the distributed resource 104 to the virtual network 112 in accordance with the request 146. Advantageously, this may be accomplished without consuming a significant number of private VIP addresses within the private IP address space of the virtual network 112. As indicated above, the resource 104 may be managed by a distributed resource service 120, and the resource 104 may be distributed across a large number of nodes 110 that are uniquely addressable within the address space of the distributed resource service 120. The distributed resource 104 may be mapped to the virtual network 112 in such a way that the number of private VIP addresses that are used by the distributed resource 104 in the address space of the virtual network 112 is significantly less than the number of nodes 110 that are uniquely addressable in the address space of the distributed resource service 120.

The method 200 also involves creating 206 a resource map 114 that relates the address space of the virtual network 112 to the address space of the distributed resource service 120. For example, the resource map 114 may include, for each node 110, information about how the node 110 is identified in the address space of the virtual network 112 as well as information about how the node 110 is identified in the address space of the distributed resource service 120.

The method 200 also includes distributing 208 the resource map 114 to various entities, including entities that implement the virtual network 112 (e.g., host machines 140 that host virtual machines 142 that belong to the virtual network 112) and/or entities that implement the distributed resource service 120 (e.g., a gateway 108 that facilitates access to the distributed resource 104 by clients 102 within the virtual network 112).

When modifications are made to the way in which the resource 104 is distributed across the nodes 110, the resource map 114 may be updated 210 based on those modifications. The updated resource map 114 may then be distributed 212 to the relevant entities that implement the virtual network 112 and/or that implement the distributed resource service 120.

Figure 3:
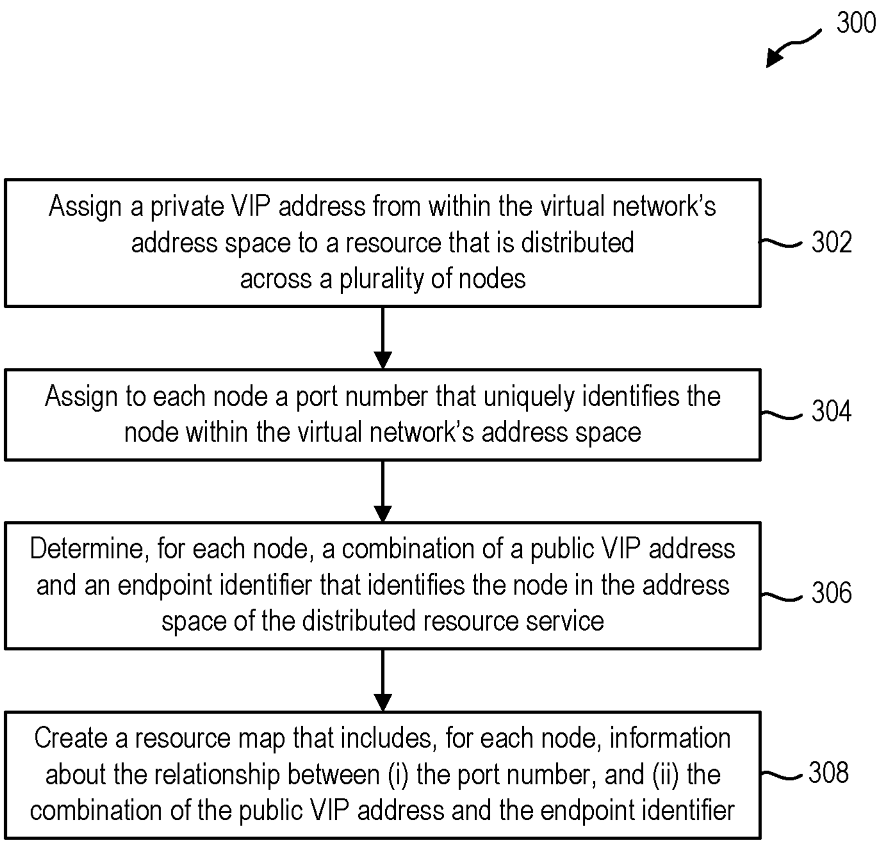
FIG. 3 illustrates an example of a method that may be performed in order to map a distributed resource to a virtual network.

FIG. 3 illustrates an example of a method 300 that may be performed in order to map 202 a distributed resource 104 to a virtual network 112. In other words, the method 300 shown in FIG. 3 illustrates one possible way that the action of mapping 202 a distributed resource 104 to a virtual network 112 may be performed in the method 200 shown in FIG. 2.

In accordance with the method 300, a private VIP address corresponding to an address space of a virtual network 112 may be assigned 302 to a resource 104 that is distributed across a plurality of nodes 110. In the system 100 shown in FIG. 1, the private VIP address that is assigned to the distributed resource 104 is represented as Private VIP1.

In addition, each of the nodes 110 may be assigned 304 a port number. The port number that is assigned to a particular node 110 is unique within the virtual network 112 and can therefore be used to identify the node 110 within the virtual network 112. In the system 100 shown in FIG. 1, the port numbers that are assigned to the nodes 110*a-c* are represented as PortA, PortB, and PortC.

The method 300 also involves determining 306, for each node 110, a combination of a public VIP address and an endpoint identifier that identifies the node 110 in the address space of the distributed resource service 120. In embodiments where the method 300 is performed by an entity that is distinct from the distributed resource service 120, this information may be obtained from the distributed resource service 120. In the system 100 shown in FIG. 1, the combinations of public VIP addresses and endpoint identifiers corresponding to the nodes 110*a-c* are represented as VIP1:EP1, VIP2:EP2, VIP3:EP3.

The method 300 also involves creating 308 a resource map 114. The resource map 114 may include, for each node 110, information 116 about the relationship between (i) the port number that identifies the node 110 within the address space of the virtual network 112, and (ii) the combination of a public VIP address and an endpoint identifier that identifies the node 110 in the address space of the distributed resource service 120. For example, in the system 100 shown in FIG. 1, the resource map 114 includes information 116*a* about the relationship between (i) the port number (PortA) that identifies the first node 110*a* in the address space of the virtual network 112, and (ii) the combination of a public VIP address (VIP1) and an endpoint identifier (EP1) that identifies the first node 110*a* in the address space of the distributed resource service 120. The resource map 114 includes similar information 116*b-c* for the second node 110*b* and the third node 110*c*.

Another aspect of the present disclosure is related to the way in which a resource map may be used by various entities that implement a distributed resource service. In some embodiments, a resource map may be distributed to and used by a gateway that facilitates access to a distributed resource by clients, which could include clients within a virtual network.

As discussed above, a resource may be distributed across a large number of nodes. The gateway may maintain address information for the nodes. The address information may take the form of <public VIP, endpoint identifier> pairs corresponding to the nodes of the distributed resource. When a client wants to access the distributed resource, the client may send a message to the gateway. This type of message may be referred to herein as a "redirect request message" because the message may be interpreted as a request for information that should redirect the client to the nodes that include the distributed resource.

Previously, in response to receiving a redirect request message, the gateway would respond with one or more <public VIP, endpoint identifier> pairs corresponding to the nodes of the distributed resource. For example, referring to the system 100 shown in FIG. 1, the gateway could respond with <VIP1, EP1>, <VIP2, EP2>, <VIP3, EP3>, and so forth. However, the public VIPs and endpoint identifiers should not be exposed to clients that access the distributed resource using private VIPs.

In accordance with the techniques disclosed herein, when the gateway receives a redirect request message and detects that the redirect request message is from a client in a virtual network that has mapped the distributed resource to a private VIP address, the gateway responds by sending address information to the client in the address space of the virtual network. The address information may include one or more address-port pairs. For example, the gateway may send one or more <private VIP, port> pairs back to the client. The gateway can use the resource map to determine the <private VIP, port> pairs. Alternatively, the gateway may send one or more <DNS_name, port> pairs back to the client, where the DNS_name corresponds to a domain name server (DNS) name that resolves to the private VIP address. The client may use the address information that it receives from the gateway to connect to the relevant node(s).

As also discussed above, the resource map relates the address space of the distributed resource service to the address space of the virtual network. More specifically, the resource map includes address information for the nodes across which the resource is distributed. The resource map includes address information in the address space of the virtual network in addition to the address space of the distributed resource service. The resource map makes it possible for the gateway to inform clients how to access the distributed resource using the virtual network address space rather than the distributed resource service address space.

Figure 4:
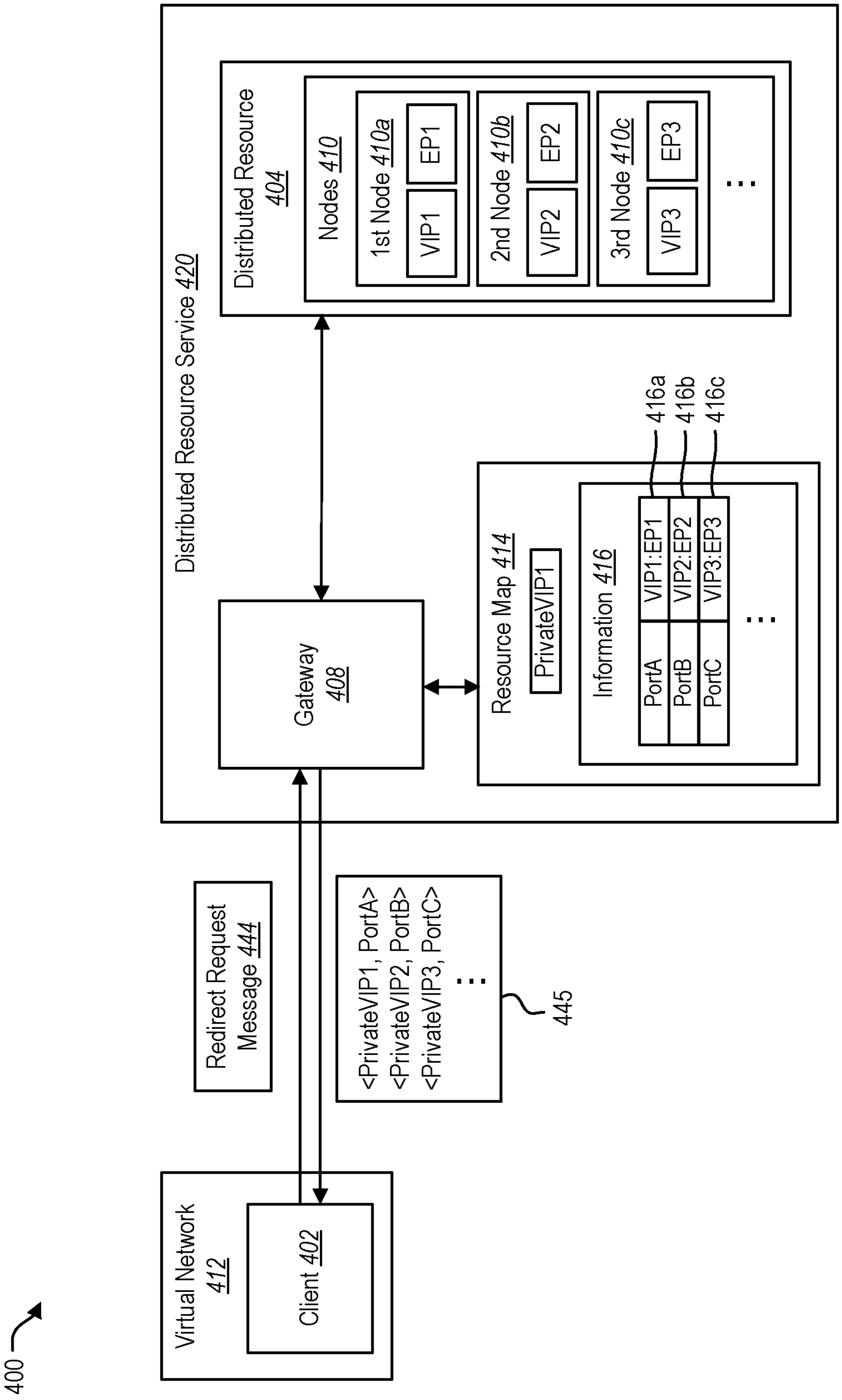
FIG. 4 illustrates an example of a system in which a gateway uses a resource map to respond to redirect request messages that the gateway receives from clients in a virtual network.

FIG. 4 illustrates an example of a system 400 in which a gateway 408 uses a resource map 414 to respond to redirect request messages 444 that the gateway 408 receives from clients 402 in a virtual network 412. The gateway 408 is part of a distributed resource service 420 that manages a distributed resource 404. As before, the resource 404 is distributed across a plurality of nodes 410.

The gateway 408 may maintain information about where various parts of the distributed resource 404 are stored on the nodes 410. When a client 402 wants to access the distributed resource 404, the client 402 may send a redirect request message 444 to the gateway 408. The gateway 408 may interpret the redirect request message 444 as a request to access the distributed resource 404 (or at least some part(s) of the distributed resource 404).

For purposes of the present example, it will be assumed that the client 402 shown in FIG. 4 belongs to a virtual network 412. In addition, it will be assumed that the client 402 has mapped the distributed resource 404 to a private VIP address, which will be referred to as PrivateVIP1. This private VIP address (PrivateVIP1) is included in a resource map 414, along with additional information 416 for each node 410. In particular, the resource map 414 includes, for each node 410, information 416 about the relationship between (i) the port number that uniquely identifies that node 410 within the address space of the virtual network 412, and (ii) the combination of a public VIP address and an endpoint identifier that uniquely identifies that node 410 within the address space of the distributed resource service 420. Thus, in the depicted example, the resource map 414 includes information 416*a* about the relationship between (i) the port number (PortA) that uniquely identifies the first node 410*a* in the address space of the virtual network 412, and (ii) the combination of a public VIP address (VIP1) and an endpoint identifier (EP1) that uniquely identifies the first node 410*a* in the address space of the distributed resource service 420. The resource map 414 also includes information 416*b* about the relationship between (i) the port number (PortB) that uniquely identifies the second node 410*b* in the address space of the virtual network 412, and (ii) the combination of a public VIP address (VIP2) and an endpoint identifier (EP2) that uniquely identifies the second node 410*b* in the address space of the distributed resource service 420. The resource map 414 also includes information 416*c* about the relationship between (i) the port number (PortC) that uniquely identifies the third node 410*c* in the address space of the virtual network 412, and (ii) the combination of a public VIP address (VIP3) and an endpoint identifier (EP3) that uniquely identifies the third node 410*c* in the address space of the distributed resource service 420.

The gateway 408 may respond to the redirect request message 444 by providing address information to the client 402 that indicates how to access the distributed resource 404. Advantageously, the address information may be in the address space of the virtual network 412. For example, the gateway 408 may send one or more <private VIP, port> pairs back to the client 402. The gateway 408 may obtain the <private VIP, port> pairs from the resource map 414. FIG. 4 shows the gateway 408 sending a communication 445 to the client 402 that includes <PrivateVIP1, PortA>, <Private VIP1, PortB>, <Private VIP1, PortC>, and so forth. Although FIG. 4 shows a plurality of <private VIP, port> pairs being sent to the client 402 in a single communication 445, in an alternative embodiment, a plurality of <private VIP, port> pairs may be sent to the client 402 in a plurality of separate communications.

Alternatively, instead of sending <private VIP, port> pairs back to the client 402, the gateway 408 may instead send one or more <DNS_name, port> pairs back to the client, where the DNS_name resolves to the private VIP address.

In the example shown in FIG. 4, a gateway 408 is shown responding to redirect request messages 444. In an alternative embodiment, however, an entity other than a gateway 408 may receive and respond to redirect request messages

444. For example, referring to the system 100 shown in FIG. 1, an entity on a host machine 140 may be configured to receive and respond to redirect request messages 444.

Figure 5:
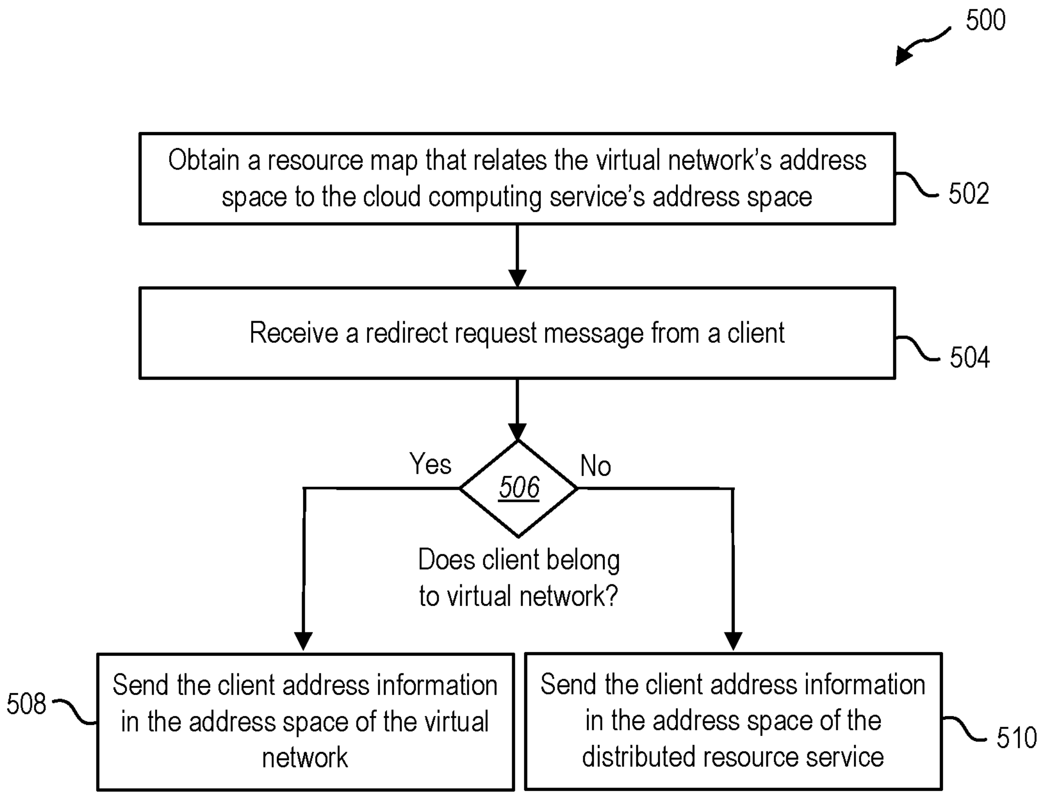
FIG. 5 illustrates an example of a method that may be performed by a gateway within a distributed resource service.

FIG. 5 illustrates an example of a method 500 that may be performed by a gateway 408 within a distributed resource service 420. The method 500 will be described in relation to the system 400 shown in FIG. 4.

The method 500 includes obtaining 502 a resource map 414 that relates the address space of the distributed resource service 420 to the address space of a virtual network 412. As discussed above, the resource 404 may be distributed across a large number of nodes 410 that are uniquely addressable within the address space of the distributed resource service 420. The resource map 414 may include, for each node 410, information about how the node 410 is identified in the address space of the virtual network 412 as well as information about how the node 410 is identified in the address space of the distributed resource service 420. For example, the resource map 414 may include, for each node 410, information 416 about the relationship between (i) a port number that identifies the node 410 within the address space of the virtual network 412, and (ii) the combination of a public VIP address and an endpoint identifier that identifies the node 410 in the address space of the distributed resource service 420.

In some embodiments, the resource map 414 may be created by the distributed resource service 420. In other words, the action of obtaining 502 the resource map 414 may involve creating the resource map 414. In other embodiments, the resource map 414 may be created by another entity that is separate from the distributed resource service 420. In such embodiments, the action of obtaining 502 the resource map 414 may involve receiving the resource map 414 from the entity (or combination of entities) that creates the resource map 414.

From time to time, the gateway 408 may receive 504 a redirect request message 444. The gateway 408 may interpret the redirect request message 444 as a request to access the distributed resource 404 (or at least some part(s) of the distributed resource 404).

In response to receiving 504 the redirect request message 444, the gateway 408 may determine 506 whether the redirect request message 444 is from a client 402 that belongs to a virtual network 412. If the gateway 408 determines 506 that the redirect request message 444 is from a client 402 that belongs to a virtual network 412, then the gateway 408 sends 508 the client 402 address information that is in the address space of the virtual network 412. For example, the gateway 408 may send one or more <private VIP, port> pairs back to the client 402, as shown in FIG. 4. The client 402 may then use the address information that it receives from the gateway 408 to communicate with the relevant node(s) 410 using the address space of the virtual network 412.

If, however, the gateway 408 determines 506 that the redirect request message 444 is from a client that does not belong to a virtual network 412, then the gateway 408 sends 510 the client address information that is in the address space of the distributed resource service 420. For example, the gateway 408 may send one or more <public VIP, endpoint identifier> pairs corresponding to the nodes 410 of the distributed resource 404. The client may then use the address information that it receives from the gateway 408 to communicate with the relevant node(s) 410 using the address space of the distributed resource service 420.

As discussed above, the gateway 408 may use the resource map 414 to determine the address information (e.g., address-port pairs) that the gateway 408 sends back to the client 402. As indicated in the method 500 shown in FIG. 5, the gateway 408 may obtain the resource map 414 separately from any redirect request messages 444 that the gateway 408 receives.

Another aspect of the present disclosure is related to the way in which a resource map may be used to translate a packet from the virtual network's address space to the distributed resource service's address space. For example, suppose that a client that belongs to a virtual network intends to send a packet to a node that includes at least a portion of a distributed resource. If the distributed resource has been mapped to the virtual network, the client is able to use the virtual network's address space to communicate with the node. Thus, in packets sent by the client, the destination address and the destination port may correspond to the virtual network's address space. The networking stack on the host machine where the client is located may use the resource map to translate packets from the virtual network's address space to the distributed resource service's address space.

Figure 6:
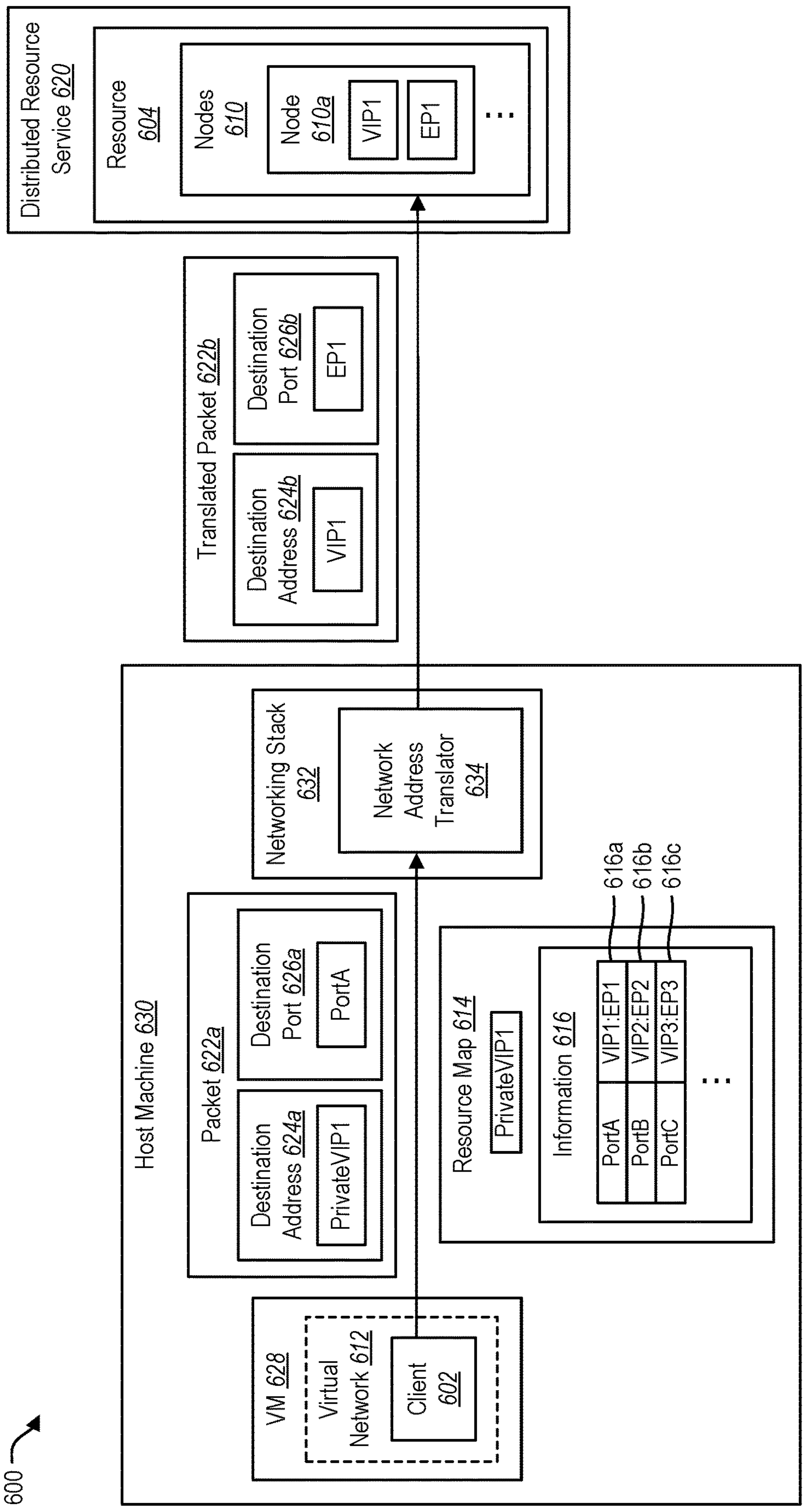
FIG. 6 illustrates an example of a system in which a resource map is used to translate a packet from the address space of a virtual network to the address space of a distributed resource service.

FIG. 6 illustrates an example of a system 600 in which a resource map 614 is used to translate a packet 622*a* from the address space of a virtual network 612 to the address space of a distributed resource service 620. In the depicted example, a resource 604 is distributed across a plurality of nodes 610. A client 602 that belongs to the virtual network 612 communicates with the nodes 610 using the address space of the virtual network 612. In other words, in packets that are sent by the client 602, the destination address and the destination port may correspond to the address space of the virtual network 612.

FIG. 6 shows the client 602 sending a packet 622*a* to a particular node 610*a* that includes at least part of the distributed resource 604. As mentioned, the resource 604 has been distributed across a plurality of nodes 610, including (but not limited to) the node 610*a* that is going to receive the packet 622*a*.

For purposes of the present example, it will be assumed that the resource 604 has been mapped to the virtual network 612 in the manner described above. Thus, the distributed resource 604 has been assigned a single private VIP address (PrivateVIP1) within the address space of the virtual network 612. In addition, each of the uniquely addressable nodes 610 across which the resource 604 is distributed is assigned a port number that is unique within the address space of the virtual network 612. The port number that has been assigned to the node 610*a* that is going to receive the packet 622*a* will be referred to as PortA.

Because the resource 604 has been mapped to the virtual network 612, it is possible for the client 602 to use the address space of the virtual network 612 to communicate with the node 610*a* (as well as other nodes 610 across which the resource 604 has been distributed). Thus, the destination address 624*a* of the packet 622*a* includes a private VIP address (PrivateVIP1) corresponding to the node 610*a*, and the destination port 626*a* of the packet 622*a* includes a port number (PortA) corresponding to the node 610*a*. The private VIP address (PrivateVIP1) and the port number (PortA) are unique within the address space of the virtual network 612. In other words, the private VIP address (PrivateVIP1) and the port number (PortA) uniquely identify the node 610*a* within the virtual network 612.

The client 602 is running on a virtual machine (VM) 628 that resides on a host machine 630. After being sent by the client 602, the packet 622*a* is delivered to a networking stack 632 on the host machine 630. The networking stack

632 detects that the destination address 624*a* (PrivateVIP1) in the packet 622*a* identifies a distributed resource 604 in the address space of the virtual network 612. This indicates to the networking stack 632 that the packet 622*a* should be translated from the address space of the virtual network 612 to the address space of the distributed resource service 620. The part of the networking stack 632 that performs the translation operation is represented in FIG. 6 as a network address translator 634. The network address translator 634 uses the resource map 614 to perform the translation operation.

The resource map 614 includes information 616 about the relationship between the address space used by the virtual network 612 and the address space used by the distributed resource service 620. In the depicted example, it will be assumed that the node 610*a* that is going to receive the packet 622*a* is associated with a public VIP address (VIP1) and an endpoint identifier (EP1) in the address space of the distributed resource service 620. Thus, the resource map 614 includes information 616*a* indicating that there is a relationship between (i) the port number (PortA) that identifies the node 610*a* within the address space of the virtual network 612, and (ii) the combination of the public VIP address (VIP1) and the endpoint identifier (EP1) that identify the node 610*a* within the address space of the distributed resource service 620.

When the network address translator 634 recognizes that the destination address 624*a* (Private VIP1) of the packet 622*a* corresponds to the address space of the virtual network 612, the network address translator 634 locates the destination port 626*a* (PortA) of the packet 622*a* in the resource map 614. The network address translator 634 then identifies the address information that is associated with PortA in the resource map 614, which in the present example is the combination of the public VIP address (VIP1) and the endpoint identifier (EP1) that identify the node 610*a* in the address space used by the distributed resource service 620.

The network address translator 634 then translates the destination address 624*a* of the packet 622*a* from the private VIP address (PrivateVIP1) that identifies the resource 604 in the address space used by the virtual network 612 to the public VIP address (VIP1) that corresponds to the node 610*a* in the address space used by the distributed resource service 620. The network address translator 634 also translates the destination port 626*a* of the packet 622*a* from the port number (PortA) that identifies the node 610*a* in the address space used by the virtual network 612 to an endpoint identifier (EP1) that corresponds to the node 610*a* in the address space used by the distributed resource service 620.

The translation performed by the network address translator 634 creates a translated packet 622*b*. The destination address 624*b* of the translated packet 622*b* is the public VIP address (VIP1) that corresponds to the node 610*a* in the address space used by the distributed resource service 620. The destination port 626*b* of the translated packet 622*b* is the endpoint identifier (EP1) that corresponds to the node 610*a* in the address space used by the distributed resource service 620. Once translation has been completed, the translated packet 622*b* can be sent to the node 610*a*.

Figure 7:
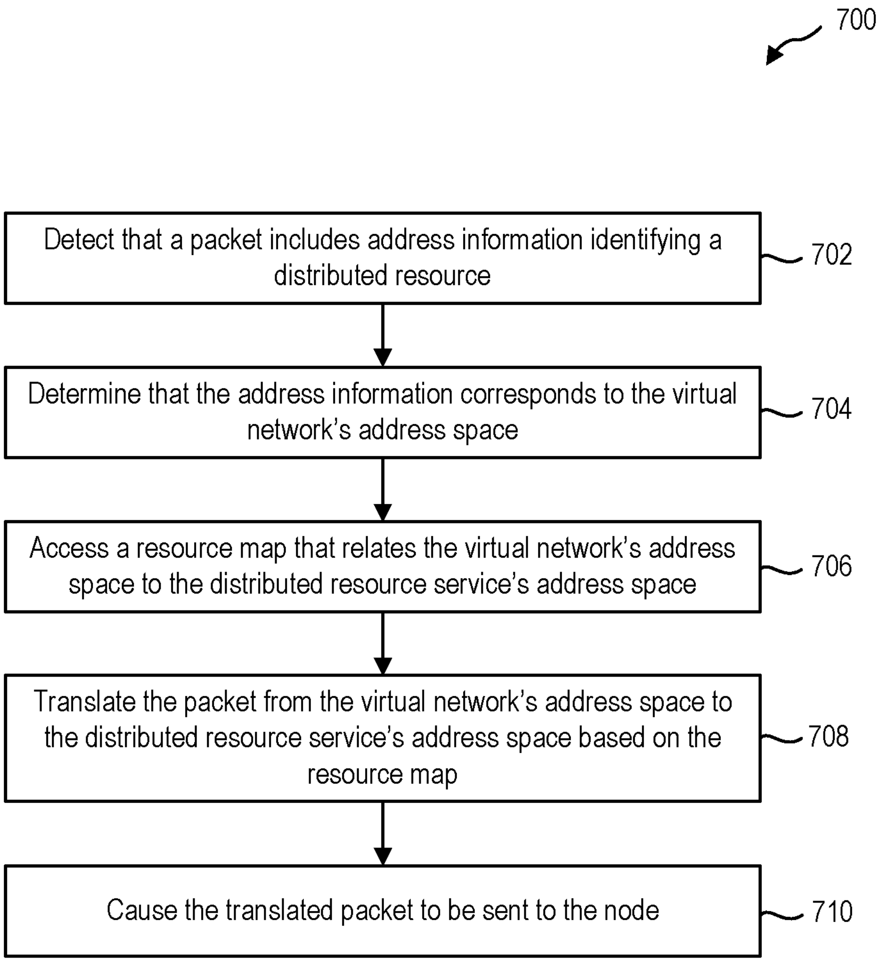
FIG. 7 illustrates an example of a method that may be performed by a networking stack of a host machine in the system shown in FIG. 6.

FIG. 7 illustrates an example of a method 700 that may be performed by a networking stack 632 of a host machine 630. The method 700 will be described in relation to the system 600 shown in FIG. 6.

The method 700 includes detecting 702 that a packet 622*a* includes address information identifying a distributed resource 604. For example, the networking stack 632 may detect that the destination address 624*a* (PrivateVIP1) in the packet 622*a* identifies a distributed resource 604.

The method 700 also includes determining 704 that the address information corresponds to the address space of a virtual network 612. For example, the networking stack 632 may determine that the destination address 624*a* (Private VIP1) in the packet 622*a* corresponds to the address space of a virtual network 612.

In response to detecting 702 that a packet 622*a* includes address information identifying a distributed resource 604 and determining 704 that the address information corresponds to the address space of a virtual network 612, the network address translator 634 within the networking stack 632 may access 706 a resource map that relates the address space of the virtual network 612 to the address space of a distributed resource service 620.

The network address translator 634 may then translate 708 the packet 622*a* from the address space of the virtual network 612 to the address space of the distributed resource service 620 based on the resource map 614. This results in the creation of a translated packet 622*b*. The method 700 may then include causing 710 the translated packet 622*b* to be sent to the node 610*a*.

In the examples described previously, a distributed resource has been mapped to just one virtual network. However, a distributed resource may be mapped to more than one virtual network in accordance with the present disclosure. In embodiments where a distributed resource is mapped to more than one virtual network, the distributed resource may be assigned at least one private VIP address in each virtual network to which it is mapped. In some embodiments, however, the same port numbers may be assigned to the nodes in different virtual networks in order to identify the nodes across which the resource is distributed.

Figure 8:
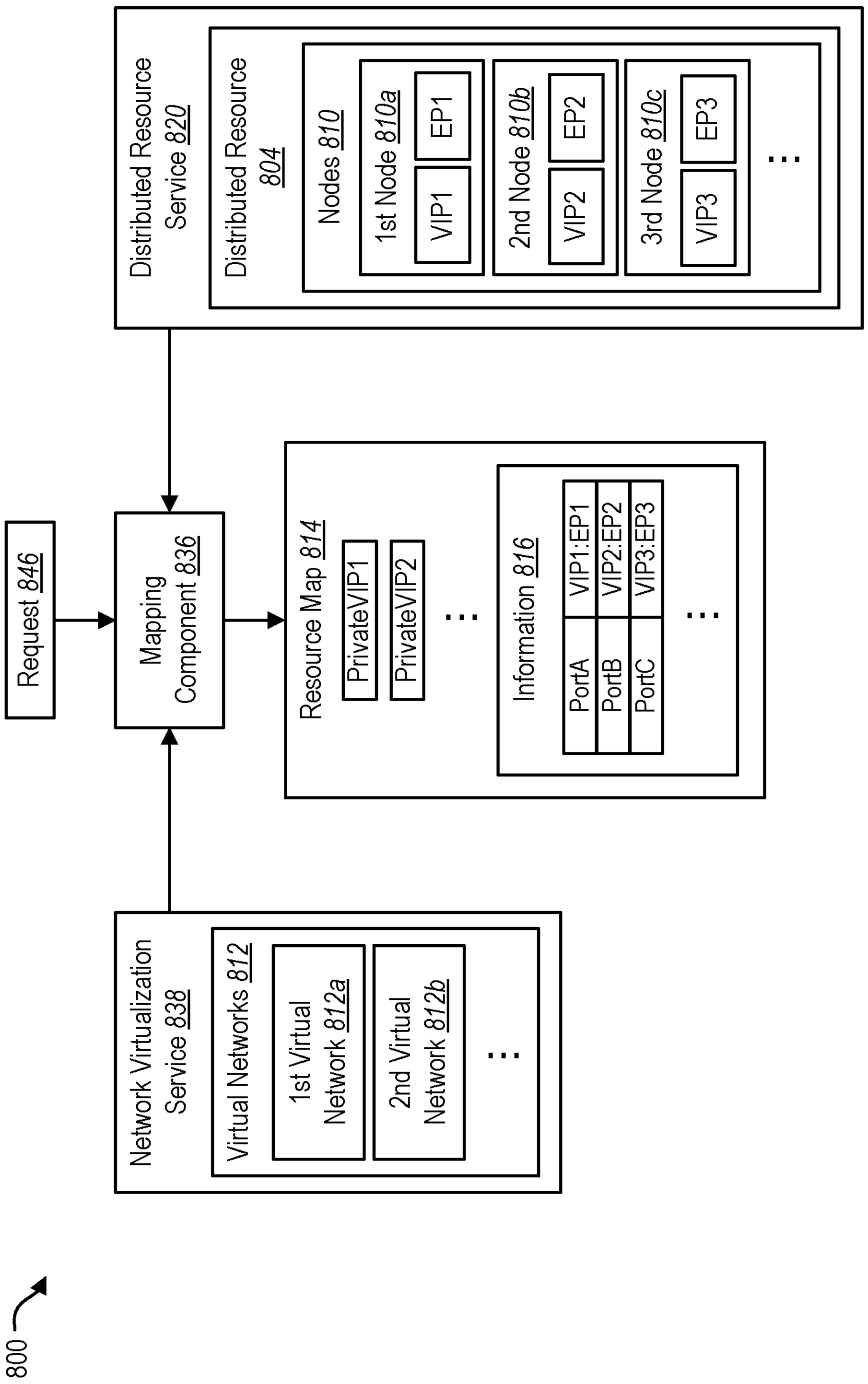
FIG. 8 illustrates an example of a system in which a distributed resource is mapped to a plurality of virtual networks.

FIG. 8 illustrates an example of a system 800 in which a distributed resource 804 is mapped to a plurality of virtual networks 812. Two virtual networks 812 are shown in FIG. 8, namely a first virtual network 812*a* and a second virtual network 812*b*. However, a distributed resource 804 may be mapped to more than two virtual networks 812 in accordance with the present disclosure. The virtual networks 812 may be managed by a network virtualization service 838.

The distributed resource 804 may initially be mapped to the first virtual network 812*a*. This mapping may occur in response to a request 846 from an authorized entity, such as an owner or representative of the first virtual network 812*a*. In the depicted example, it will be assumed that the distributed resource 804 is mapped to the first virtual network 812*a* in a manner that is similar to the process described above. That is, the distributed resource 804 may be assigned a private VIP address within the address space of the first virtual network 812*a*. This private VIP address will be referred to herein as Private VIP1. In addition, each of the uniquely addressable nodes 810 across which the resource 804 is distributed may be assigned a port number that is unique within the first virtual network 812*a*. In the depicted example, the first node 810*a* is assigned a port number that will be referred to herein as PortA, the second node 810*b* is assigned a port number that will be referred to herein as PortB, the third node 810*c* is assigned a port number that will be referred to herein as PortC, and so forth.

At some point, it may be determined that the distributed resource 804 should be mapped to an additional virtual network 812, namely the second virtual network 812*b*. In order to map the distributed resource 804 to the second virtual network 812*b*, the distributed resource 804 may be assigned a private VIP address within the address space of the second virtual network 812*b*. This private VIP address will be referred to herein as Private VIP2.

In addition, each of the uniquely addressable nodes 810 across which the resource 804 is distributed may be assigned a port number that is unique within the second virtual network 812*b*. In the depicted example, however, each node 810 is assigned the same port number that it was assigned when the distributed resource 804 was mapped to the first virtual network 812*a*. In particular, the first node 810*a* is assigned PortA, the second node 810*b* is assigned PortB, the third node 810*c* is assigned PortC, and so forth. These port numbers are unique within the second virtual network 812*b*, just as they are unique within the first virtual network 812*a*. Thus, these port numbers uniquely identify the nodes 810 within both first virtual network 812*a* and also the second virtual network 812*b*.

As before, the resource map 814 relates the address space of the distributed resource service 820 (which manages the distributed resource 804) to the address space of the virtual network 812. The entity (or combination of entities) that creates the resource map 814 is represented in FIG. 8 as a mapping component 836. In the depicted example, the resource map 814 includes the private VIP address (Private VIP1) that is assigned to the distributed resource 804 in connection with the first virtual network 812*a*, as well as the private VIP address (PrivateVIP2) that is assigned to the distributed resource 804 in connection with the second virtual network 812*b*. In addition, the resource map 814 includes, for each node 810, information 816 about the relationship between (i) the port number that uniquely identifies that node 810 within the address space of the virtual networks 812*a-b*, and (ii) the combination of a public VIP address and an endpoint identifier that uniquely identifies that node 810 within the address space of the distributed resource service 820.

FIG. 8 shows just one resource map 814 for both the first virtual network 812*a* and the second virtual network 812*b*. In an alternative embodiment, multiple resource maps may be created. For example, a separate resource map may be created for each virtual network 812 to which the distributed resource 804 is mapped.

Figure 9:
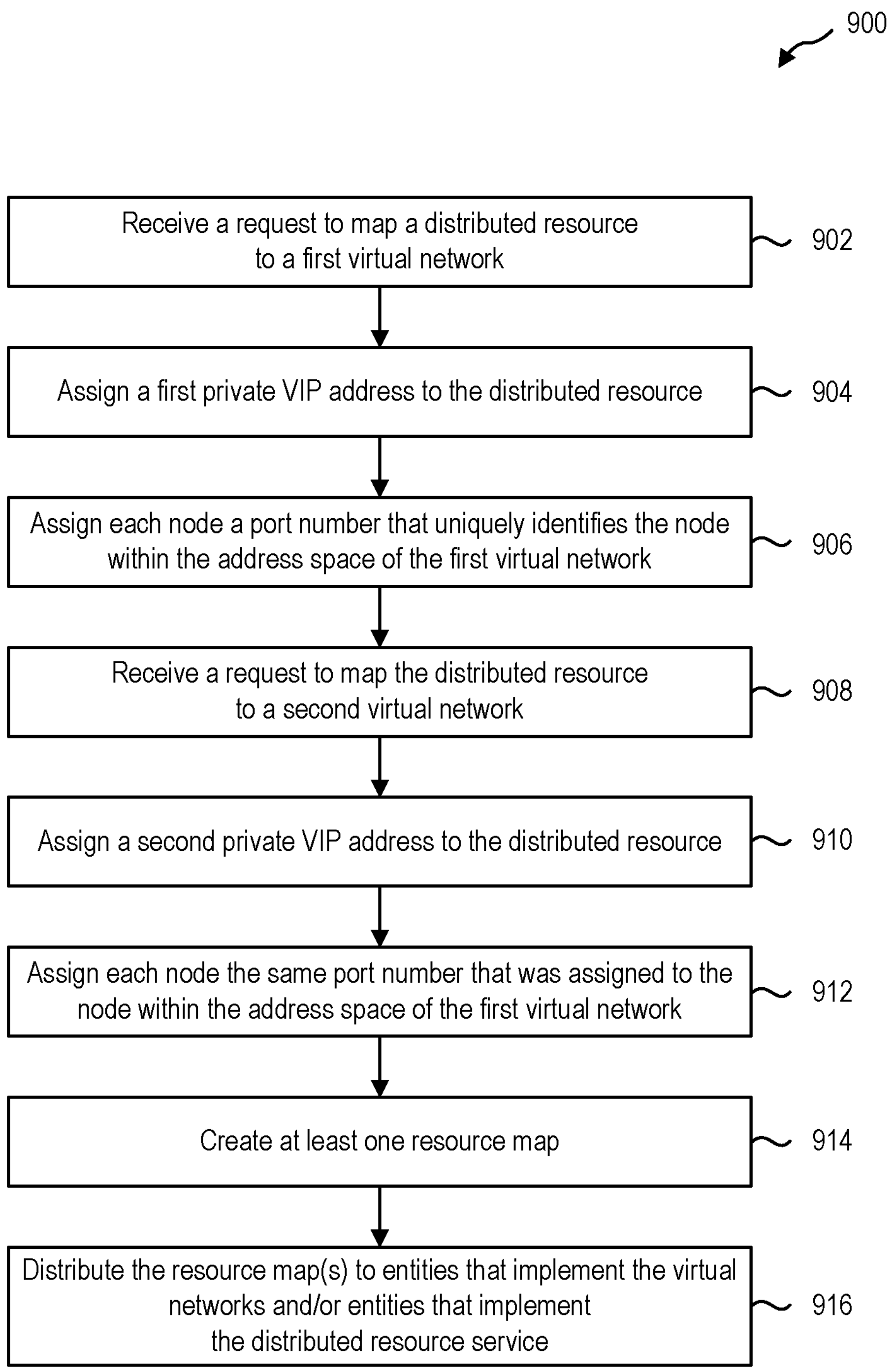
FIG. 9 illustrates an example of a method that may be performed by an entity (or a combination of entities) that is represented in FIG. 9 as a mapping component.

FIG. 9 illustrates an example of a method 900 that may be performed by an entity (or a combination of entities) that is represented in FIG. 8 as a mapping component 836. The method 900 will be described in relation to the system 800 shown in FIG. 8.

At some point, a request 846 to map a distributed resource 804 to a first virtual network 812*a* may be received 902. In response to such a request 846, the mapping component 836 may assign 904 a first private VIP address (Private VIP1) to the distributed resource 804. This private VIP address (Private VIP1) may correspond to the address space of the first virtual network 812*a*. In addition, the mapping component 836 may assign 906 each node 810 a port number that uniquely identifies the node 810 within the address space of the first virtual network 812*a*. For example, the first node 810*a* may be assigned PortA, the second node 810*b* may be assigned PortB, the third node 810*c* may be assigned PortC, and so forth.

Subsequently, a request 846 may be received 908 to map the distributed resource 804 to a second virtual network 812*b*. In response to such a request 846, the mapping component 836 may assign 910 a second private VIP address (Private VIP2) to the distributed resource 804. This private VIP address (Private VIP2) may correspond to the address space of the second virtual network 812*b*. In addition, the mapping component 836 may assign 912 each node 810 the same port number that was assigned to the node 810 within the address space of the first virtual network 812*a*. For example, the first node 810*a* may once again be assigned PortA, the second node 810*b* may once again be assigned PortB, the third node 810*c* may once again be assigned PortC, and so forth.

The method 900 may also include creating 914 at least one resource map 814 that relates the address spaces of the first virtual network 812*a* and the second virtual network 812*b* to the address space of the distributed resource service 820. In addition, the method 900 may include distributing 916 the resource map(s) 814 to various entities, including entities that implement the virtual networks 812*a-b* (e.g., host machines that host virtual machines that belong to the virtual networks 812*a-b*) and/or entities that implement the distributed resource service 820 (e.g., a gateway that facilitates access to the distributed resource 804 by clients within the virtual networks 812*a-b*).

Figure 10:
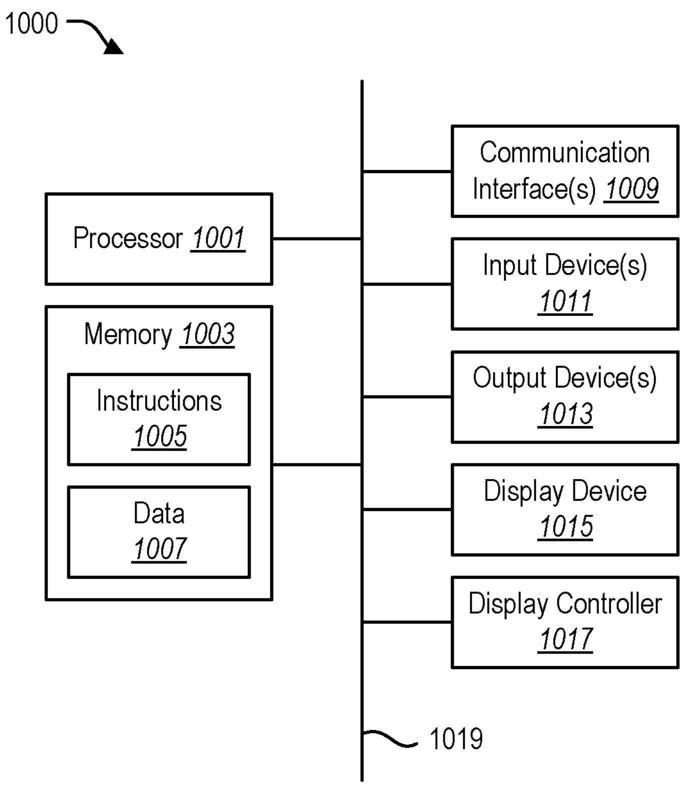
FIG. 10 illustrates certain components that may be included within a computing device.

One or more computing devices 1000 may be used to implement the techniques disclosed herein. FIG. 10 illustrates certain components that may be included within a computing device 1000.

The computing device 1000 includes a processor 1001. The processor 1001 may be a general purpose single- or multi-chip microprocessor (e.g., an Advanced RISC (Reduced Instruction Set Computer) Machine (ARM)), a special purpose microprocessor (e.g., a digital signal processor (DSP)), a microcontroller, a programmable gate array, etc. The processor 1001 may be referred to as a central processing unit (CPU). Although just a single processor 1001 is shown in the computing device 1000 of FIG. 10, in an alternative configuration, a combination of processors (e.g., an ARM and DSP) could be used.

The computing device 1000 also includes memory 1003 in electronic communication with the processor 1001. The memory 1003 may be any electronic component capable of storing electronic information. For example, the memory 1003 may be embodied as random access memory (RAM), read-only memory (ROM), magnetic disk storage media, optical storage media, flash memory devices in RAM, on-board memory included with the processor 1001, erasable programmable read-only memory (EPROM), electrically erasable programmable read-only memory (EEPROM) memory, registers, and so forth, including combinations thereof.

Instructions 1005 and data 1007 may be stored in the memory 1003. The instructions 1005 may be executable by the processor 1001 to implement some or all of the methods, steps, operations, actions, or other functionality that is disclosed herein. Executing the instructions 1005 may involve the use of the data 1007 that is stored in the memory 1003. Unless otherwise specified, any of the various examples of modules and components described herein may be implemented, partially or wholly, as instructions 1005 stored in memory 1003 and executed by the processor 1001. Any of the various examples of data described herein may be among the data 1007 that is stored in memory 1003 and used during execution of the instructions 1005 by the processor 1001.

The computing device 1000 may also include one or more communication interfaces 1009 for communicating with other electronic devices. The communication interface(s) 1009 may be based on wired communication technology, wireless communication technology, or both. Some examples of communication interfaces 1009 include a Universal Serial Bus (USB), an Ethernet adapter, a wireless adapter that operates in accordance with an Institute of Electrical and Electronics Engineers (IEEE) 1002.11 wireless communication protocol, a Bluetooth® wireless communication adapter, and an infrared (IR) communication port.

A computing device 1000 may also include one or more input devices 1011 and one or more output devices 1013. Some examples of input devices 1011 include a keyboard, mouse, microphone, remote control device, button, joystick, trackball, touchpad, and lightpen. One specific type of output device 1013 that is typically included in a computing device 1000 is a display device 1015. Display devices 1015 used with embodiments disclosed herein may utilize any suitable image projection technology, such as liquid crystal display (LCD), light-emitting diode (LED), gas plasma, electroluminescence, or the like. A display controller 1017 may also be provided, for converting data 1007 stored in the memory 1003 into text, graphics, and/or moving images (as appropriate) shown on the display device 1015. The computing device 1000 may also include other types of output devices 1013, such as a speaker, a printer, etc.

The various components of the computing device 1000 may be coupled together by one or more buses, which may include a power bus, a control signal bus, a status signal bus, a data bus, etc. For the sake of clarity, the various buses are illustrated in FIG. 10 as a bus system 1019.

Some examples of various terms and phrases that are used in the above discussion and/or that are used in the accompanying claims will now be provided.

The term "virtual network" may refer to a group of virtual and/or physical computing devices that can communicate with each other in a cloud computing environment. A virtual network may be created and managed by a software-based administrative entity that performs network virtualization services in a cloud computing system. Resources in a cloud computing system that belong to the same virtual network may be able to communicate with each other, with other entities that are accessible via the Internet, and/or with other entities in an on-premises network.

The term "distributed resource" may refer to a resource in a cloud computing system that is distributed across a plurality of nodes. For example, a resource may be stored on and/or executed by a plurality of nodes. In this context, the term "node" may refer to any virtual or physical computing device that can be used to store and/or execute a resource or a portion thereof. For example, a node may be a virtual machine, and a resource may be distributed across a plurality of virtual machines. As another example, a node may be a host machine, and a resource may be distributed across a plurality of host machines. In some cases, a resource may be distributed across a plurality of virtual machines and also distributed across a plurality of host machines. A resource may be said to be distributed across a plurality of nodes if at least part of the resource is stored on a plurality of different nodes. In some situations, a distributed resource may be duplicated on different nodes. In other words, the same part(s) of the resource may be stored on different nodes. Alternatively, different parts of a distributed resource may be stored on different nodes, without being duplicated.

The term "distributed resource service" may refer to an entity (or a combination of entities) within a cloud computing system that manages a distributed resource. A distributed resource service may enable users to perform various functions such as creating distributed resources, making changes to existing distributed resources, and using distributed resources to perform various actions. A distributed resource service may interact with a network virtualization service in connection with mapping a distributed resource to a virtual network.

The term "virtual network address space" may refer to the address space of a virtual network. Similarly, the term "distributed resource service address space" may refer to the address space of a distributed resource service.

The term "resource map" may refer to any data structure or combination of multiple data structures that includes information that relates the address space of a distributed resource service to the address space of one or more virtual networks. A resource map may include information about a plurality of nodes across which a resource is distributed. A resource map may include, for each node, (i) information about how the node is identified in the address space of the virtual network, (ii) information about how the node is identified in the address space of the distributed resource service, and (iii) information indicating a relationship between (i) and (ii). The information related to (iii) may be in the form of a link or other type of association between two data structures or sub-structures.

The term "entity" may refer to anything that exists as a distinct or independent unit. In some situations, the term entity may refer to a computing device or a software process that is executed on a computing device. For example, the host machines 140 shown in the system 100 of FIG. 1 are entities, as are the virtual machines 142, clients 102, and networking stacks 132 that are running on those host machines 140. In other situations, the term entity may refer to a human being or a group of human beings acting together. In still other situations, the term entity may refer to a computing device or a software process that is being controlled by one or more human beings to perform one or more operations.

The term "address information" may refer to any numerical or alphanumerical designation that can be associated with a computing device in order to facilitate routing of data packets to the computing device over one or more computer networks. Depending on the context in which it is used, the term "address information" may refer to an IP address, a port number, or the combination of an IP address and a port number.

An entity is "uniquely addressable" in the address space of a network if that entity is associated with address information that is different from the address information that is associated with other entities in the network. As an example, an entity is uniquely addressable in a network if the entity is associated with a particular combination of an IP address (or virtual IP address) and a port number, and no other entity in that network is associated with the same combination of the IP address and the port number. Thus, two different entities within the same network may be uniquely addressable even if they have the same IP address (or virtual IP address), as long as they have different port numbers.

The term "computing device" may refer to any electronic equipment that includes memory and a processor that is configured to follow instructions stored in the memory to perform sequences of mathematical and logical operations. Some examples of computing devices that may be used in connection with the disclosed embodiments include desktop computers, laptop computers, smartphones, tablet computers, and smartwatches.

The term "host machine" may, in general, refer to a physical computing device. In the context of a cloud computing system, the term "host machine" may refer to a physical computing device that hosts virtualized computing resources such as virtual machines, virtual data stores, virtual networks, or the like.

The term "determining" (and grammatical variants thereof) may encompass a wide variety of actions and, therefore, "determining" can include calculating, computing, processing, deriving, investigating, looking up (e.g., looking up in a table, a database or another data structure), ascertaining and the like. Also, "determining" can include receiving (e.g., receiving information), accessing (e.g., accessing data in a memory) and the like. Also, "determining" can include resolving, selecting, choosing, establishing and the like.

The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features. For example, any element or feature described in relation to an embodiment herein may be combinable with any element or feature of any other embodiment described herein, where compatible.

The techniques described herein may be implemented in hardware, software, firmware, or any combination thereof, unless specifically described as being implemented in a specific manner. Any features described as modules, components, or the like may also be implemented together in an integrated logic device or separately as discrete but interoperable logic devices. If implemented in software, the techniques may be realized at least in part by a non-transitory computer-readable medium having computer-executable instructions stored thereon that, when executed by at least one processor, perform some or all of the steps, operations, actions, or other functionality disclosed herein. The instructions may be organized into routines, programs, objects, components, data structures, etc., which may perform particular tasks and/or implement particular data types, and which may be combined or distributed as desired in various embodiments.

The steps, operations, and/or actions of the methods described herein may be interchanged with one another without departing from the scope of the claims. In other words, unless a specific order of steps, operations, and/or actions is required for proper functioning of the method that is being described, the order and/or use of specific steps, operations, and/or actions may be modified without departing from the scope of the claims.

The present disclosure may be embodied in other specific forms without departing from its spirit or characteristics. The described embodiments are to be considered as illustrative and not restrictive. The scope of the disclosure is, therefore, indicated by the appended claims rather than by the foregoing description. Changes that come within the meaning and range of equivalency of the claims are to be embraced within their scope.

What is claimed is:

1. A method, comprising:

receiving, at a gateway implemented on a distributed resource service, a redirect request message that comprises a request for information to redirect a client to access a distributed resource on the distributed resource service, wherein the distributed resource is distributed across a plurality of nodes;

detecting that the redirect request message is from the client that belongs to a virtual network, the client having mapped the distributed resource to a private virtual Internet protocol (VIP) address;

accessing a resource map to determine address information that indicates how to access the distributed resource associated with the VIP address in a virtual network address space, wherein the resource map comprises, for each node of the plurality of nodes, first information that uniquely identifies the node within the virtual network address space and second information that uniquely identifies the node within a distributed resource service address space; and sending the address information to the client in response to the redirect request message.

2. The method of claim 1, wherein the address information comprises a plurality of address-port pairs, each address-port pair comprising the private VIP address and a different port number that uniquely identifies a different node in the virtual network address space.

3. The method of claim 1, wherein the address information comprises a plurality of name-port pairs, each name-port pair comprising a domain name server (DNS) name that resolves to the private VIP address and a different port number that uniquely identifies a different node in the virtual network address space.

4. The method of claim 1, wherein the resource map comprises, for each node of the plurality of nodes:

a port number that uniquely identifies the node within the virtual network address space; and a combination of a public VIP address and an endpoint identifier that uniquely identifies the node within the distributed resource service address space.

5. The method of claim 1, wherein:

the distributed resource service manages the distributed resource.

6. The method of claim 1, wherein the redirect request message is received at a host machine that comprises a virtual machine that belongs to the virtual network.

7. The method of claim 1, wherein the resource map is maintained on the distributed resource service.

8. A system, comprising:

at least one processor;

memory in electronic communication with the at least one processor; and instructions stored in the memory, the instructions being executable by the at least one processor to:

receive, at a gateway implemented on a distributed resource service, a redirect request message that comprises a request for information to redirect a client to access a distributed resource on the distributed resource service, wherein the distributed resource is distributed across a plurality of nodes;

detect that the redirect request message is from the client that belongs to a virtual network, the client having mapped the distributed resource to a private virtual Internet protocol (VIP) address;

access a resource map to determine address information that indicates how to access the distributed resource associated with the VIP address in a virtual network address space, wherein the resource map comprises, for each node of the plurality of nodes, first information that uniquely identifies the node within the virtual network address space and second information that uniquely identifies the node within a distributed resource service address space; and send the address information to the client in response to the redirect request message.

9. The system of claim 8, wherein the address information comprises a plurality of address-port pairs, each address-port pair comprising the private VIP address and a different port number that uniquely identifies a different node in the virtual network address space.

10. The system of claim 8, wherein the address information comprises a plurality of name-port pairs, each name-port pair comprising a domain name server (DNS) name that resolves to the private VIP address and a different port number that uniquely identifies a different node in the virtual network address space.

11. The system of claim 8, wherein the resource map comprises, for each node of the plurality of nodes:

a port number that uniquely identifies the node within the virtual network address space; and a combination of a public VIP address and an endpoint identifier that uniquely identifies the node within the distributed resource service address space.

12. The system of claim 8, wherein:

the distributed resource service manages the distributed resource.

13. The system of claim 8, wherein the redirect request message is received at a host machine that comprises a virtual machine that belongs to the virtual network.

14. The system of claim 8, wherein the resource map is maintained on the distributed resource service.

15. A non-transitory computer readable medium storing instructions thereon that, when executed by at least one processor, causes one or more computing devices to:

receive, at a gateway implemented on a distributed resource service, a redirect request message that comprises a request for information to redirect a client to access a distributed resource on the distributed resource service, wherein the distributed resource is distributed across a plurality of nodes;

detect that the redirect request message is from the client that belongs to a virtual network, the client having mapped the distributed resource to a private virtual Internet protocol (VIP) address;

access a resource map to determine address information that indicates how to access the distributed resource associated with the VIP address in a virtual network address space, wherein the resource map comprises, for each node of the plurality of nodes, first information that uniquely identifies the node within the virtual network address space and second information that uniquely identifies the node within a distributed resource service address space; and send the address information to the client in response to the redirect request message.

16. The non-transitory computer readable medium of claim 15, wherein the address information comprises a plurality of address-port pairs, each address-port pair comprising the private VIP address and a different port number that uniquely identifies a different node in the virtual network address space.

17. The non-transitory computer readable medium of claim 15, wherein the address information comprises a plurality of name-port pairs, each name-port pair comprising a domain name server (DNS) name that resolves to the private VIP address and a different port number that uniquely identifies a different node in the virtual network address space.

18. The non-transitory computer readable medium of claim 15, wherein the resource map comprises, for each node of the plurality of nodes:

a port number that uniquely identifies the node within the virtual network address space; and a combination of a public VIP address and an endpoint identifier that uniquely identifies the node within the distributed resource service address space.

19. The non-transitory computer readable medium of claim 15, wherein:

the distributed resource service manages the distributed resource.

20. The non-transitory computer readable medium of claim 15, wherein the redirect request message is received at a host machine that comprises a virtual machine that belongs to the virtual network.

* * * * *